US012239868B2

(12) United States Patent
VerBrugge et al.

(10) Patent No.: US 12,239,868 B2
(45) Date of Patent: Mar. 4, 2025

(54) ULTRA-HIGH TEMPERATURE FUSIBLE LINK

(71) Applicant: Tyco Fire Products LP, Lansdale, PA (US)

(72) Inventors: Michael J. VerBrugge, Belgium, WI (US); Manuel R. Silva, Jr., Cranston, RI (US); Brian J. Kramer, Lubbock, TX (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/150,612

(22) Filed: Jan. 5, 2023

(65) Prior Publication Data

US 2023/0149757 A1 May 18, 2023

Related U.S. Application Data

(63) Continuation of application No. 17/038,569, filed on Sep. 30, 2020, now Pat. No. 11,602,654.

(60) Provisional application No. 62/908,880, filed on Oct. 1, 2019.

(51) Int. Cl.
*A62C 37/12* (2006.01)

(52) U.S. Cl.
CPC .................................. *A62C 37/12* (2013.01)

(58) Field of Classification Search
CPC .................................................... A62C 37/12
See application file for complete search history.

(56) References Cited

U.S. PATENT DOCUMENTS

| | | | | | |
|---|---|---|---|---|---|
| 807,205 | A | * | 12/1905 | Rockwood | A62C 37/12 169/39 |
| 1,092,562 | A | | 4/1914 | Cotton et al. | |
| 1,209,574 | A | | 12/1916 | Grimes | |
| 1,248,433 | A | | 11/1917 | Lewis | |
| 1,485,002 | A | | 2/1924 | Wilson | |
| 1,613,453 | A | * | 1/1927 | Grimshaw | A62C 37/12 169/42 |
| 1,909,123 | A | * | 5/1933 | Rockwood | A62C 37/12 169/39 |
| 1,934,279 | A | * | 11/1933 | Rockwood | A62C 37/12 169/42 |
| 2,011,272 | A | | 8/1935 | Duggan | |
| 2,075,816 | A | * | 4/1937 | Loepsinger | A62C 37/12 169/39 |
| 2,526,159 | A | | 10/1950 | Rowley | |

(Continued)

OTHER PUBLICATIONS

MatWeb, MasterBond, Indium Corp, Indalloy 150 Pb—In Solder Allow Mar. 6, 2019. Maserbond . all pages (Year: 2019).*

(Continued)

*Primary Examiner* — Joseph A Greenlund
(74) *Attorney, Agent, or Firm* — Foley & Lardner LLP

(57) ABSTRACT

A fusible link assembly including a first detection line, a second detection line, and a fusible link. The fusible link includes, a first substrate with a first end coupled to the first detection line, a second substrate with a first end coupled to the second detection line, and a solder layer directly bonded to a second end of the first substrate and a second end of the second substrate. The solder layer is configured to prevent separation of the first substrate and the second substrate until the solder layer reaches a temperature between 500° F.-575° F.

14 Claims, 5 Drawing Sheets

(56) References Cited

U.S. PATENT DOCUMENTS 2,730,900 A * 1/1956 Rowley ................. F16K 17/383 49/7
3,061,016 A * 10/1962 Hodgman, Jr. ........ A62C 37/12 169/42
3,314,482 A * 4/1967 Young ................... F16K 17/386 169/41
3,407,879 A * 10/1968 O'Rear .................. A62C 3/006 169/30
3,463,236 A * 8/1969 Andersen ............... A62C 37/12 169/59
3,638,734 A * 2/1972 Ault ....................... A62C 37/12 428/605
3,779,004 A * 12/1973 Gloeckler ............... F16G 15/04 49/8
3,888,313 A * 6/1975 Freeman ................ A62C 37/12 169/37
3,897,828 A * 8/1975 Glover ................... A62C 37/12 169/65
4,055,829 A * 10/1977 Ruegsegger ........... A62C 37/12 169/42
4,103,272 A * 7/1978 Larsen ................... A62C 37/12 337/411
4,346,554 A * 8/1982 Glinecke ................. F16G 15/04 169/42
4,405,914 A * 9/1983 Ruegsegger ........... H01H 37/76 337/152
4,532,681 A * 8/1985 Baker ................... B60R 22/322 228/191
4,738,314 A * 4/1988 Lee ........................ A62C 37/12 169/42
4,893,679 A * 1/1990 Martin ................... A62C 37/12 169/42
5,120,152 A * 6/1992 Gueli ..................... A62C 37/12 169/42
5,645,128 A * 7/1997 Schwall ................. A62C 37/44 169/42
5,686,878 A * 11/1997 Gueli ..................... A62C 2/242 337/411
5,927,890 A * 7/1999 Job ........................ A62C 37/14 403/2
6,404,322 B1 * 6/2002 Ruegsegger .......... F16B 31/007 337/159
9,452,305 B2 * 9/2016 De Vries ................ A62C 37/12
9,702,487 B2 * 7/2017 Rose, Jr. .................... F16L 9/14
11,199,286 B1 * 12/2021 Beranek .............. F16L 55/1141
2002/0011527 A1 * 1/2002 Onuki .................... A62C 37/12 239/75
2009/0056958 A1 * 3/2009 Polan ..................... A62C 37/12 169/37
2010/0294521 A1 * 11/2010 Thompson ............. A62C 37/12 169/57
2011/0180277 A1 * 7/2011 Jimenez ................. A62C 37/11 169/37
2012/0048577 A1 * 3/2012 Ball ....................... A62C 3/006 169/65
2016/0030787 A1 * 2/2016 De Vries ................ A62C 37/12 169/46
2016/0089556 A1 * 3/2016 Jeong ..................... A62C 35/68 169/90
2016/0310773 A1 * 10/2016 Abels ....................... A62C 3/06
2017/0120090 A1 * 5/2017 Magnone ............... A62C 37/46
2017/0216641 A1 * 8/2017 Magnone ............... A62C 3/002
2019/0015688 A1 * 1/2019 Stimek ................... A62C 3/006
2019/0184218 A1 * 6/2019 Silva, Jr. ................ A62C 37/14
2021/0093908 A1 * 4/2021 VerBrugge ............. A62C 37/48
2021/0347152 A1 * 11/2021 Gross ........................ B64C 3/20

OTHER PUBLICATIONS

Dampney Protective Coatings, "Thermalox 250 Selective Black Solar Collector Coating" Dampney Engineered Coatings, Sep. 1, 2016.
Matweb, "Indium Corp., Indalloy, 150 Pb—In Solder Alloy" Mar. 6, 2019, Masterbond.
Tyco Fire Protection Products, Model SL and Model A-PC Fusible Links, Ansul Data Sheet, 2013, 2 pages.

* cited by examiner

ULTRA-HIGH TEMPERATURE FUSIBLE LINK

CROSS-REFERENCE TO RELATED PATENT APPLICATIONS

This application is a continuation of U.S. patent application Ser. No. 17/038,569, filed Sep. 30, 2020, which claims the benefit of and priority to U.S. Provisional Application No. 62/908,880, filed on Oct. 1, 2019, the disclosure of which is incorporated herein by reference in its entirety.

BACKGROUND

Fire suppression systems are commonly used to protect an area and objects within the area from fire. Fire suppression systems can be activated manually or automatically in response to an indication that a fire is present nearby (e.g., an increase in ambient temperature beyond a predetermined threshold value, etc.). Once activated, fire suppression systems spread a fire suppression agent throughout the area. The fire suppressant agent then extinguishes or prevents the growth of the fire.

SUMMARY

One embodiment of the present disclosure relates to a fusible link assembly. The fusible link assembly including a first detection line, a second detection line, and a fusible link. The fusible link includes, a first substrate with a first end coupled to the first detection line, a second substrate with a first end coupled to the second detection line, and a solder layer directly bonded to a second end of the first substrate and a second end of the second substrate. The solder layer is configured to prevent separation of the first substrate and the second substrate until the solder layer reaches a temperature between 500° F.-575° F.

Another embodiment of the present disclosure relates to a fusible link. The fusible link includes, a first substrate, a second substrate, and a solder layer directly bonded to a first end of the first substrate and a first end of the second substrate. The solder layer is configured to prevent separation of the first substrate and the second substrate until the solder layer reaches a temperature between 500° F.-575° F.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
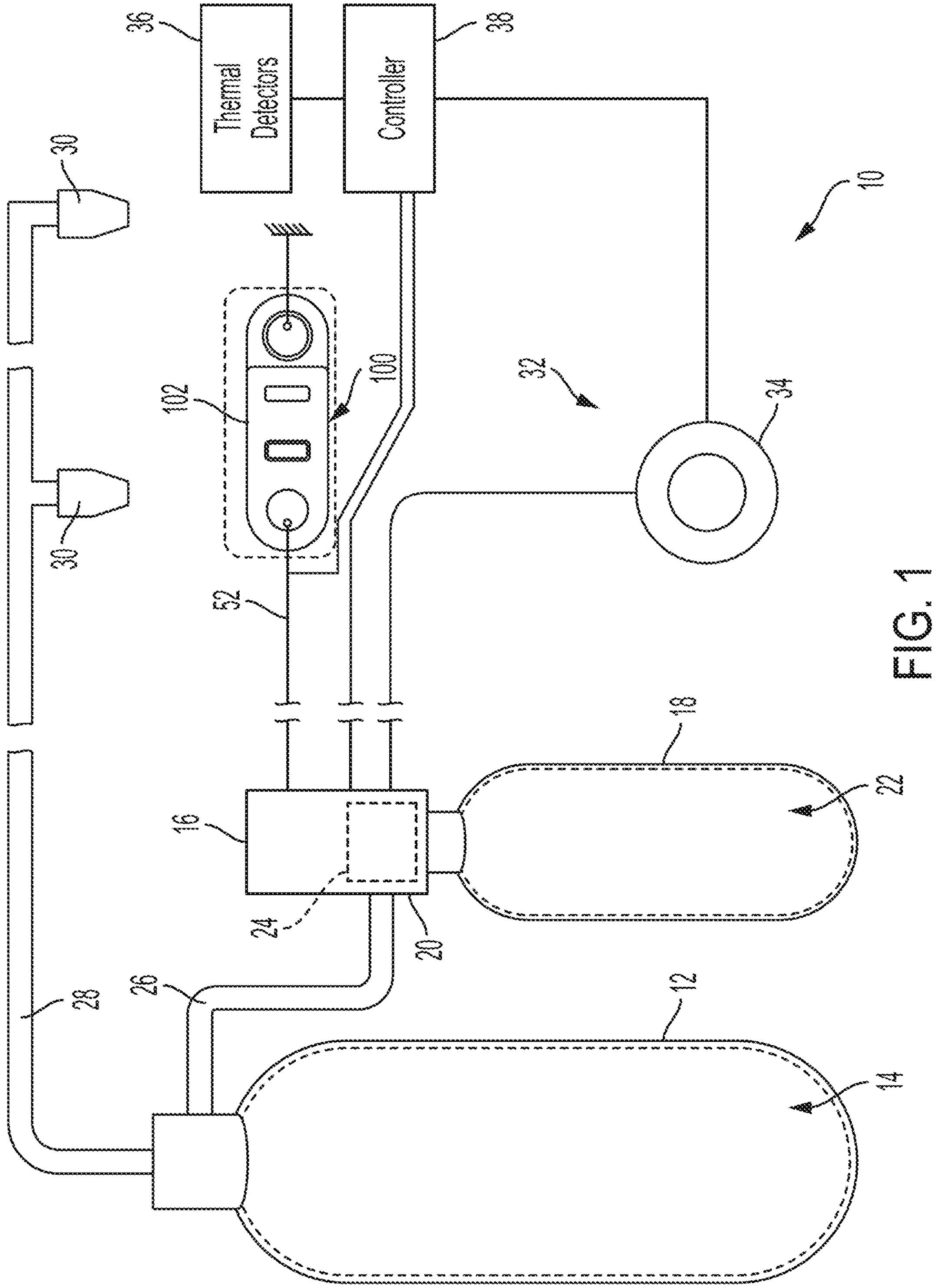
FIG. 1 is an illustration of a fire suppression system according to an exemplary embodiment.
Figure 2:
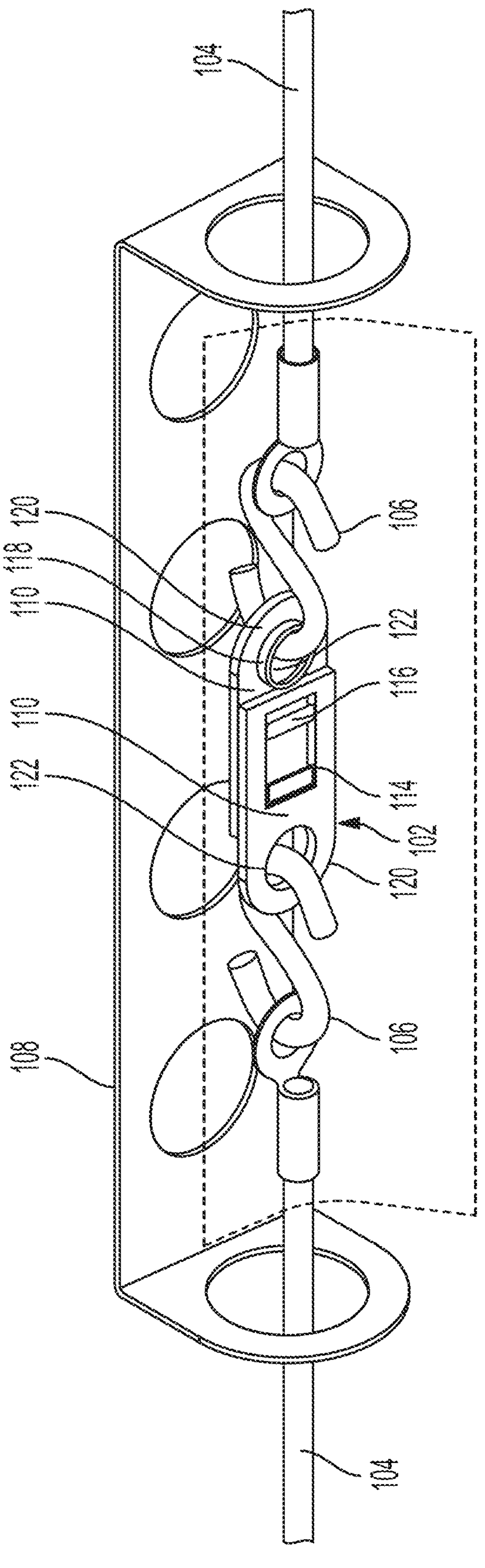
FIG. 2 is a perspective view of a fusible link according to an exemplary embodiment.
Figure 3:
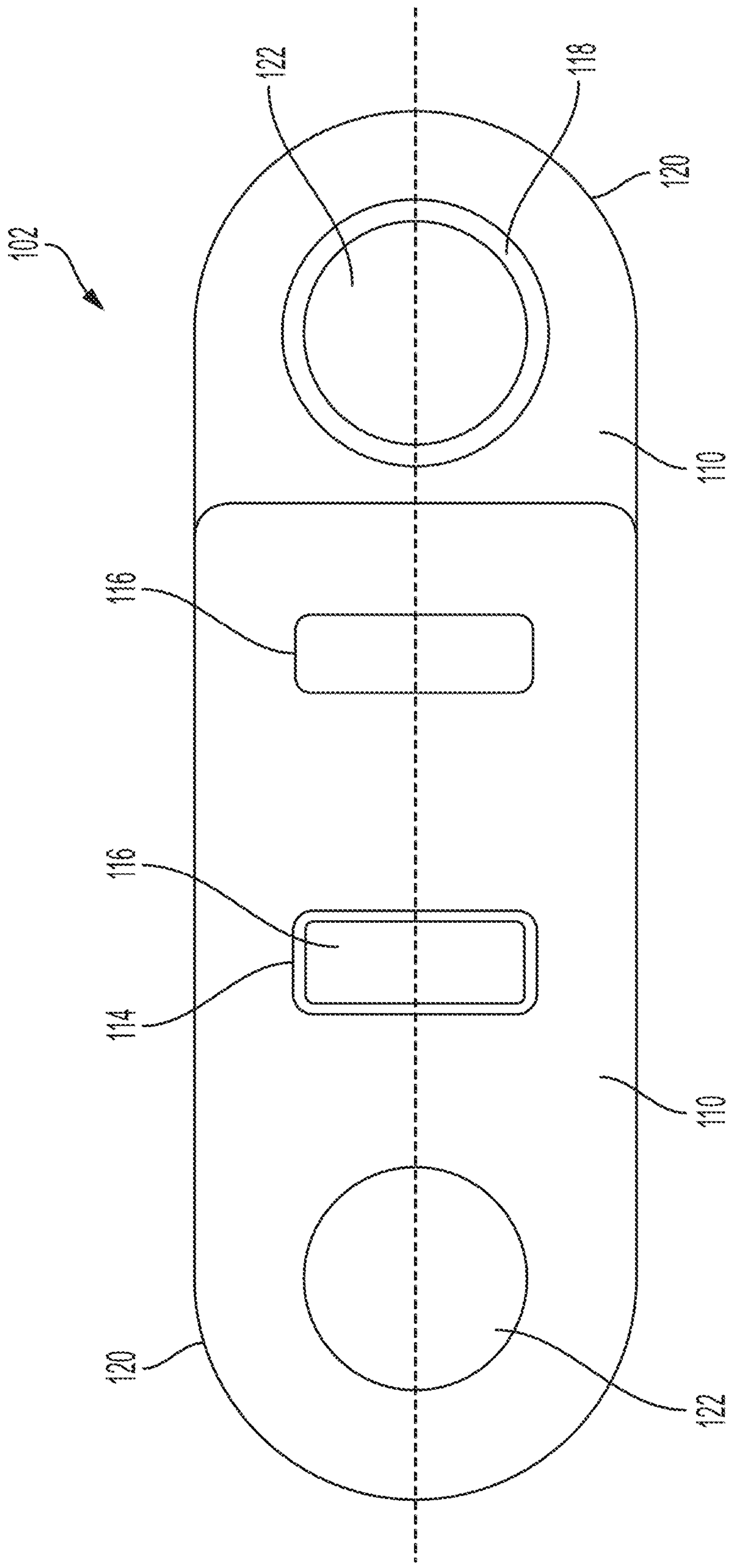
FIG. 3 is an illustration of the fusible link of FIG. 2.
Figure 4:
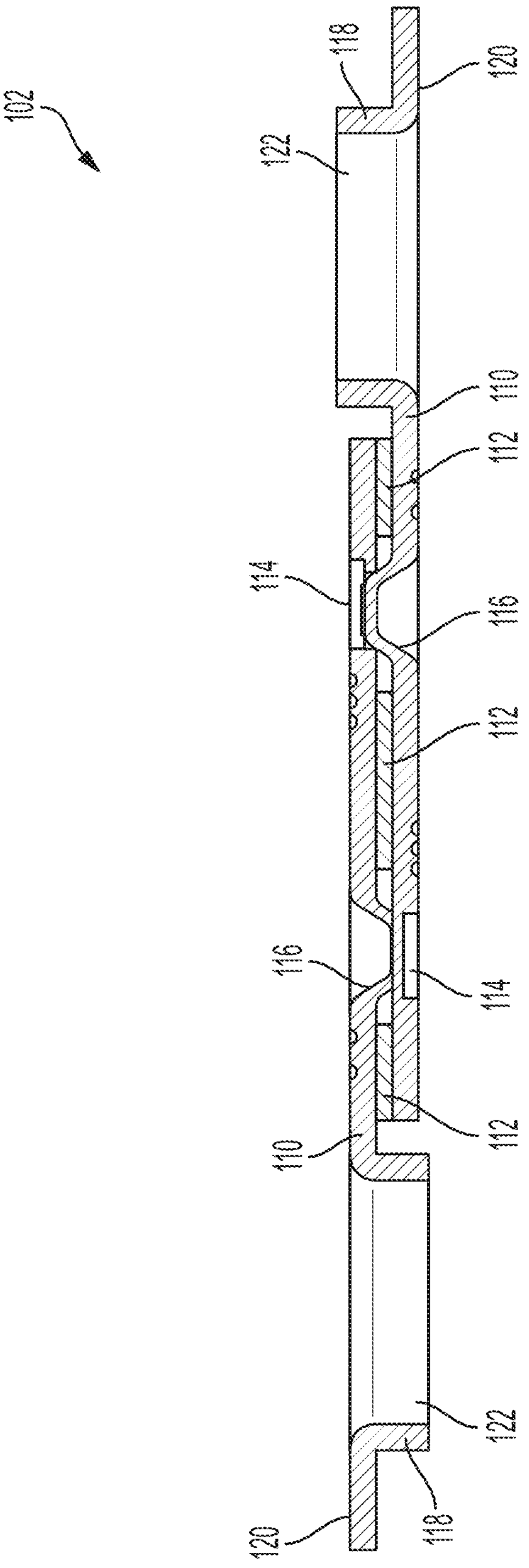
FIG. 4 is a partial section view of the fusible link of FIG. 3.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Hazard areas (e.g., kitchens, vehicles, etc.) often place flammable materials (e.g., grease, oil, cloth, hydraulic fluid, etc.) in close proximity to hazards, such as engines with superheated components (e.g., combustion chamber, etc.), or cooking appliances that include heat sources (e.g., ovens, stoves, fryers, etc.). Because of this, hazard areas often experience fires, especially in the engine bay or near cooking appliances. Hazard areas are often outfitted with fire suppression systems to combat such fires. These fire suppression systems generally include nozzles that are configured to supply a fire suppressant agent (e.g., water, foam, powder, etc.) toward a hazard (e.g., one of the cooking appliances) in response to detection of a fire to suppress the fire. Detection components, such as fusible links, are implemented in the hazard areas to determine if a fire has ignited, as well as activate safety components (e.g., closure of a fire door, closing/opening of vents, dampers, etc.).

Fusible links generally include a pair of fusible link plates coupled with a solder. The solder in part determines the temperature rating for the fusible link that may be set forth by a safety or regulation agency or company such as, for example, Underwriters Laboratories (UL). Fusible links may be classified into Low (e.g., 125-130° F.), Ordinary (e.g., 135-170° F.), Intermediate (e.g., 175-225° F.), High (e.g., 250-300° F.), Extra high (e.g., 325-375° F.), Very extra high (e.g., 400-475° F.), and Ultra high (e.g., 500-575° F.) temperature classifications. Each temperature classification may also have a maximum ambient temperature set forth by UL or another organization, such as Low (90° F.), Ordinary (100° F.), Intermediate (150° F.), High (225° F.), Extra high (300° F.), Very extra high (375° F.), and Ultra high (475° F.). In the event of a fire in a hazard area, the ambient temperature will increase. Once the ambient temperature increases to a temperature within an activation temperature range for a fusible link, the fusible link decouples. Once the fusible link is decoupled, the fire suppression system receives an activation signal to release fire suppressant agent.

Fusible links or components thereof can include a plating and/or a coating. The plating can be a metal (e.g., gold alloy, silver alloy, nickel alloy, etc.) and facilitate stronger mechanical bonding of solder to the fusible link plates. The coating can be a non-metal or a metal-based material (e.g., wax, paint, etc.). The coating can prevent corrosion of the fusible link, which could cause malfunctions of the fusible link if corroded. For example, according to some UL standards the coating should resist cracking, flaking, slipping, or flowing when tested at the maximum temperature in which the assembly may be installed. The coating can also refer to a color code identifying a specific temperature rating (e.g., low, ordinary, intermediate, high, extra high, very extra high, ultra high, etc.) of the fusible link.

Fusible links may be required to pass various tests set forth by UL. These tests may test various properties of the fusible link which could cause failure of the fusible link in a fire suppression system, such as the response time of the fusible link, the durability when exposed to high temperatures below the maximum ambient temperature, and corrosive resistance.

Referring generally to the figures, fire suppression systems are configured for use in a hazard area (e.g., a kitchen, an engine, etc.). Fire suppression systems include elements that suppress fire within the hazard area. One or more nozzles are configured to release a fire suppressant agent on an element (e.g., a combustion chamber, a supercharger, a fryer, a stovetop, etc.). The nozzles are fluidly coupled to an agent tank, which is configured to contain a quantity of fire suppressant agent. A release assembly is coupled to the agent tank to facilitate the release of fire suppression agent from the agent tank via an actuator and a cartridge of expellant gas. The actuator is configured to facilitate the release of the expellant gas from the cartridge into the agent tank.

The fire suppression system includes a control system configured to facilitate activation (e.g., puncture of the cartridge, etc.) of the fire suppression system. The control system includes a controller configured to receive and transmit signals to various components of the fire suppression system. The signals can be received from one or more fire detection devices (e.g., fusible links, linear detection lines, thermal detectors, etc.), which are configured to sense if a fire has occurred within a coverage zone of the fire detection devices. Fusible links are rated for specific ranges of temperatures. Thermal properties of the materials used for the various components of the fusible link determine the specific temperature range for the fusible link. Therefore, certain materials are usable in certain applications of fusible links, for example, higher ambient temperatures within a hazard area may require higher temperature rated fusible links to prevent malfunctions of the fire suppression system. Specific paints, coatings, and solders are beneficial in ultra-high temperature rated fusible links.

Referring to FIG. 1, among others, a fire suppression system 10 is shown. The fire suppression system 10 can be configured to suppress a fire in a stationary application (e.g., a kitchen, etc.) or in a mobile application (e.g., a truck, etc.). The fire suppression system 10 can utilize various fire suppressant agents (e.g., foam, water, etc.) to suppress a fire. The fire suppression system 10 is configured to activate (e.g., release the fire suppressant agent, etc.) if a fire is detected. The fire suppression system 10 can be configured to release a large quantity of agent over a short duration of time. The fire suppression system 10 can be configured to release a larger quantity of agent over a first duration, then release a smaller quantity over a second longer duration to prevent the fire from reigniting. The fire suppression system 10 can be activated mechanically or electronically.

The fire suppression system 10 includes an agent tank 12. The agent tank 12 defines an internal volume 14, which contains a quantity of fire suppressant agent (e.g., foam, water, etc.). The agent tank 12 can be positioned in close proximity to a hazard area to facilitate rapid activation of the fire suppression system 10. The agent tank 12 can be positioned remote of the hazard area to facilitate more accessibility to the agent tanks 12. The agent tanks 12 are coupled to a release assembly 16, which is configured to facilitate the release of fire suppressant agent from the agent tanks 12. The release assembly 16 includes a cartridge 18 and an actuator 20 removably coupled to the agent tank 12. The cartridge 18 defines an internal volume 22 configured to contain a quantity of release gas. The actuator 20 couples to the cartridge 18 and includes a mechanism 24 (e.g., a pin, a needle, a blade, etc.) configured to penetrate the internal volume 22 of the cartridge 18. The release assembly 16 couples to a release piping 26, which fluidly couples the internal volume 22 of the cartridge 18 to the internal volume 14 of the agent tank 12, such that when the actuator 20 penetrates the internal volume 22 of the cartridge 18, the release gas can flow from the cartridge 18 to the internal volume 14 of the agent tank 12.

The fire suppression system 10 also includes distribution piping 28 (e.g., tubing, etc.) coupled to the agent tank 12. The distribution piping 28 and the agent tank 12 can be removably coupled to facilitate removal of the agent tank 12 from the fire suppression system 10. The distribution piping 28 can be configured to direct the fire suppression agent released from the agent tank 12 to one or more nozzles 30. The nozzles 30 can be coupled to the distribution piping 28 at distal ends (e.g., ends open to an ambient environment, etc.) and configured to release the fire suppression agent into the ambient environment. The nozzles 30 are directed (e.g., aimed, etc.) such that the fire suppression agent, when released into the ambient environment, releases towards a hazard area (e.g., an area with a higher chance of fire, etc.) to suppress a fire within the hazard area.

The fire suppression system 10 can be configured to activate automatically and/or manually. The fire suppression system 10 is configured to activate manually, such that the fire suppression system 10 includes a manual activation device 32. The manual activation device 32 may include a button 34, a knob, a lever, a switch, or another type of user interface that is configured to receive an input from a user. The manual activation device 32 can be located in close proximity to the hazard area, or the manual activation device 32 can be located remote from the hazard area. The fire suppression system 10 includes at least one manual activation device 32 located in close proximity to the hazard area and at least one manual activation device 32 located remote from the hazard area. The fire suppression system 10 is configured to activate electronically, such that the fire suppression system 10 includes one or more thermal detectors 36. The thermal detectors 36 can be located in close proximity to the hazard area, and configured to detect whether a fire has ignited within the hazard area. The fire suppression system 10 can include a controller 38 configured to receive signals (e.g., electrical, mechanical, pneumatic, etc.) from the thermal detectors 36 and/or the manual activation device 32 and send signals to the actuator 20. The thermal detectors 36 and/or the manual activation device 32 are configured to send signals directly to the actuator 20.

The controller 38 is configured to send and receive signals within the fire suppression system 10. The controller 38 can be directly coupled to the manual activation device 32, the actuator 20 of the release assembly 16, and/or the thermal detectors 36. The controller 38 includes a processor and a memory. The controller 38 may be configured to provide electrical activation signals to each of the actuators. The controller 38 is configured to electronically sense (e.g., with a strain gauge, with a switch, etc.) a tensile force.

The fire suppression system 10 includes a fusible link assembly 100. The fusible link assembly 100 can be located in close proximity to the hazard area (e.g., above, adjacent, etc.). The fusible link assembly 100 can be configured to activate once an ambient temperature increases above a threshold maximum ambient temperature.

The fusible link assembly 100 includes a pair of tensile members (e.g., ropes, cables, rods, etc.), shown as detection lines 104, each coupled to a fusible link 102 by fasteners, shown as S hooks 106. A first S hook 106 couples to a first side of the fusible link 102 and a second S hook 106 couples to a second side of the fusible link 102. The detection lines 104 extend longitudinally outward from the fusible link 102. The detection lines 104 are held in tension such that the fusible link assembly 100 is held in tension. Elevated ambient temperatures cause separation of the fusible link 102, reducing the tension on the detection lines 104 and acting as a signal to activate the fire suppression system 10.

The fire suppression system 10 can include a bracket, shown as cover 108 that extends around the detection lines 104, preventing objects from coming into contact with and damaging the fusible link assembly 100.

The detection lines 104 are routed such that the detection lines 104 can send an activation signal (e.g., a reduction in tensile force) to activate one or more fire suppression functions of the fire suppression system 10. One or both of the detection lines 104 send activation signals directly to (e.g., are directly coupled to) the actuator 20 of the release assembly 16.

The detection lines 104 are indirectly coupled to the actuator 20 of the fire suppression system 10 by the controller 38. The controller 38 is a purely mechanical device that receives the tensile force from one or both of the detection lines 104 and applies forces on one or more of the actuators to control operation of the fire suppression system 10. In response to receiving an activation signal (e.g., a decrease in tensile force) from the detection line 104, the controller 38 may send an activation signal (e.g., a change in applied force) to one or more actuators to activate the fire suppression system 10. The controller 38 may include one or more mechanical devices (e.g., winches, pulleys, gears, linkages, pressurized air tanks, levers, etc.) that facilitate the transfer, conversion (e.g., from a force to a torque, etc.), or production of mechanical energy by the controller 38. The controller 38 is configured to receive the tensile force from one of the detection lines 104 and apply a tensile force to a separate detection line 104 coupled to each of the actuators. When the fusible link 102 activates, the controller 38 may receive the reduction in force (e.g., the activation signal) from the detection line 104 and change the force applied to each of the other detection lines 104, thereby providing an activation signal to each of the actuators. The controller 38 is configured to puncture or otherwise open a container of pressurized gas in response to experiencing a decrease in the tensile force of the detection line 104. The pressurized gas may pass through one or more conduits (e.g., hoses, pipes, etc.) to the actuators, such that an increase in pressure experienced by the actuators acts as an activation signal.

The fusible link assembly 100 is configured to activate a safety function of the fire suppression system 100. The safety function can be a function separate of the release of fire suppressant agent onto a fire (e.g., opening or closing a door, a vent, a damper, etc.). By way of example, the fusible link assembly 100 can couple to a vent on a first end and an anchor on a second end. The anchor prevents the fusible link assembly 100 and the vent from moving while the fusible link assembly 100 is in a non-activated state. After activation of the fusible link assembly 100, the vent may move freely (e.g., open, close, etc.) to open a flow path or close a flow path for air into or out of the hazard area. For example, the vent may open to facilitate venting of smoke out of a room, or the vent may close to lessen oxygen flow into a room.

Referring to FIGS. 1-4, the fusible link 102 is shown in greater detail. As described above, if the ambient temperature within the hazard area increases above a maximum temperature of the fusible link 102, the fusible link 102 activates to release tension in the detection lines 104. The fusible link 102 may be rated for various temperature ranges, such as Low (e.g., 125-130° F.), Ordinary (e.g., 135-170° F.), Intermediate (e.g., 175-225° F.), High (e.g., 250-300° F.), Extra high (e.g., 325-375° F.), Very extra high (e.g., 400-475° F.), and Ultra high (e.g., 500-575° F.). Fusible link 102 includes solder 112 (e.g., a thermally sensitive material, a solder layer, etc.) and fusible link plates 110 (e.g., substrates, etc.) configured to couple to the solder 112, the S hooks 106, and the detection lines 104. The solder 112 is configured to fixedly couple the fusible link plates 110 and limit the movement of the fusible link plates 110 relative to each other. The solder 112 is further configured to activate (e.g., melt, etc.) when an ambient temperature increases to a temperature above an activation temperature (e.g., a melting temperature, etc.) of the solder 112, to decouple the fusible link plates 110. The fusible link plates 110 can include a plating, as described above, (e.g., gold alloy, silver alloy, nickel alloy, etc.) configured to facilitate stronger mechanical bonding of the solder 112 to the fusible link plates 110. The fusible link 102 can also include a coating (e.g., paint, wax, etc.) applied to the soldered fusible link plates 110 configured to minimize corrosion of the fusible link 102.

The fusible link plates 110 can be identical to facilitate easier manufacturing. The fusible link plates 110 can include a coupling aperture 114 (e.g., a hole, an opening, etc.) and a coupling protrusion 116. The flexible link plates 110 can include more than one coupling aperture 114 and more than one coupling protrusion 116. The coupling aperture 114 is configured to align with the coupling protrusion 116 in an opposing fusible link plate 110. The fusible link plates 110 can include flanges 118 on a first end 120, which define an aperture 122, configured to accept the S hook 106 or another coupling device (e.g., fastener). The aperture 122 can be circular, as shown in FIGS. 1-4, however the aperture 122 can be any shape suitable for receiving the S hook 106 or other fastener. The flanges 118 are configured to minimize stress concentrations at the first end 120 of the fusible link plates 110, which could otherwise result in malfunctions of the fusible link 102.

The fusible link plates 110 can include a plating that plates a surface of the fusible link plates 110. The plating can plate a portion (e.g., more than half of the surface area, etc.) of the fusible link plates 110 to minimize an amount of plating used during manufacturing. The plating can plate the entire surface of the fusible link plates 110 to minimize surface flaws, which can cause poor bonding of the solder 112 to the fusible link plates 110. The plating can function as a bonding agent for the solder 112 to mechanically bond to the fusible link plates 110. The plating can also function as a corrosive resistant surface. The plating can be plated on the fusible link plates 110 via electroplating. Some suitable materials for the plating can be gold alloy, silver alloy, nickel alloy, etc. The fusible link plates 110 can also include multiple layers of coating (e.g., a first layer of nickel alloy and a second layer of gold or silver alloy, etc.).

By way of example, a first fusible link plate 110 is coupled to a second fusible link plate 110 with solder 112. The solder 112 is configured to mechanically bond with the first fusible link plate 110 and the second fusible link plate 110, fixedly coupling the first fusible link plate 110 to the second fusible link plate 110. The solder 112 may cover all or portions of the interfacing surfaces of fusible link plates 110. On each fusible link plate 110, the solder 112 may be provided at one or more of: between the coupling protrusion 116 and an end of the fusible link plate 110, between the coupling protrusion 116 and the coupling aperture 114, and between the coupling aperture 114 and the aperture 122. The solder 112 is configured to fixedly couple the first fusible link plate 110 to the second fusible link plate 110 until the ambient temperature surrounding the solder 112 increases to a predetermined threshold temperature. Once the ambient temperature increases above the predetermined threshold temperature, the first fusible link plate 110 decouples from the second fusible link plate 110 due to the solder 112 transitioning from a solid state to a liquid state (or a semi-liquid state). The predetermined threshold temperature depends on the material properties of the solder 112.

Suitable materials for a solder 112 with a predetermined threshold temperature threshold between 500-575° F. include high lead content thermally sensitive materials 112. Solders such as, Lead-Indium solder alloy (e.g., 81% Pb and 19% In, etc.), Lead-Tin-Silver solder alloy (e.g., 88% Pb, 10% Sn, and 2% Ag, etc.), or Lead-Tin solder alloy (e.g., 90% Pb, and 10% Sn, etc.). Examples of specific solders are Indalloy 228, 150, and 159. Fusible links utilizing Indalloy 228 had an average operating temperature, when tested per UL33 section 10, of 553° F. Fusible links utilizing Indalloy 150 had an average operating temperature, when tested per UL33 section 10, of 509° F. Fusible links utilizing Indalloy 159 had an average operating temperature, when tested per UL33 section 10, of 563° F.

Fusible link 102 can include a coating (e.g., paint, etc.), which is utilized for corrosion protection, as well as marking of the fusible link 102. The coating can cover the fusible link plates 110, and/or the solder 112. The paint resists removal (e.g., becoming chalky, flakey, etc.) after exposure to constant temperatures close to the maximum ambient temperature of the fusible link 102, and resists melting or burning when exposed to these temperatures. Many conventional paints are not suitable for ultra high temperature fusible link applications. Suitable materials for paints able to withstand temperatures of 500-575° F. include silicone based paints (e.g., Temperkote 850, Thermalox 8200, etc.).

Figure 5:
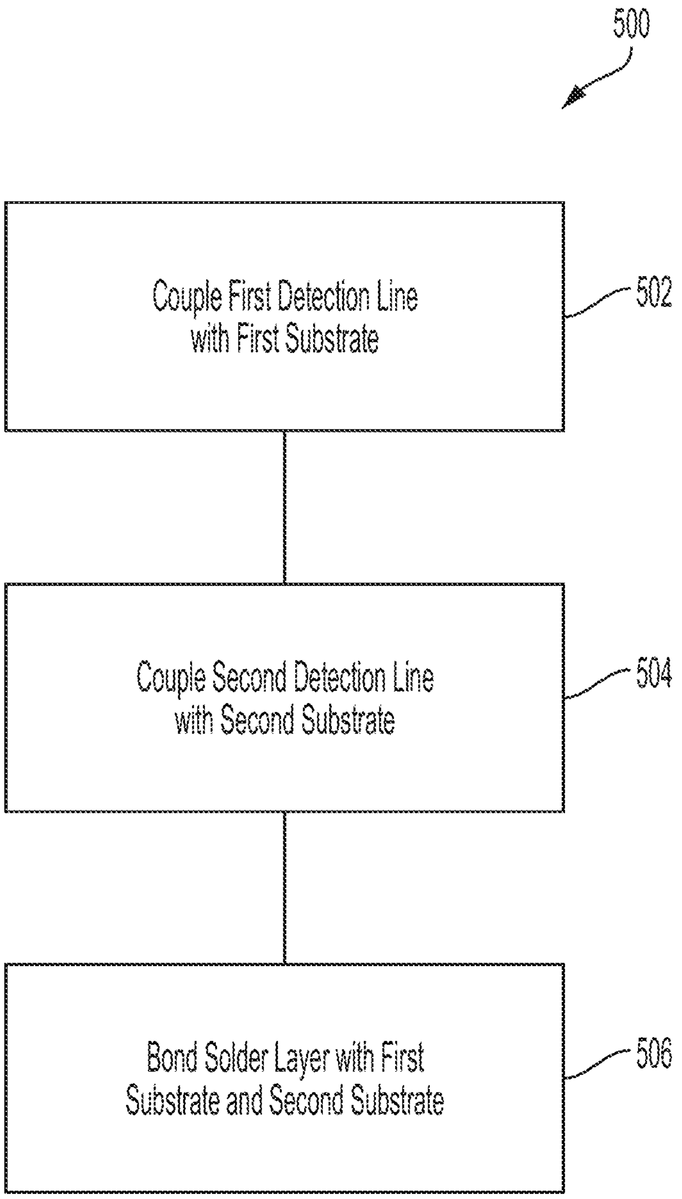
FIG. 5 is a flowchart depicting a method of using a fusible link assembly.

Referring to FIG. 5, a method 500 of using a fusible link assembly is illustrated. At 502, a first detection line (e.g., the detection line 104) is coupled with a first end of a first substrate (e.g., the fusible link plate 110) of a fusible link 102. At 504, a second detection line (e.g., the detection line 104) is coupled with a first end of a second substrate (the fusible link plate 110) of the fusible link. At 506, bonding a solder layer (e.g., the solder 112) to a second end of the first substrate and a second end of the second substrate. The solder layer is configured to prevent separation of the first substrate and the second substrate until the solder layer reaches a temperature between 500° F.-575°. The method 500 can further comprise coupling the first and second detection lines to an actuator 20 of a fire suppression system via a controller 38 and applying force on the actuator to control operation of the first suppression system. Further, once an ambient temperature increases above a predetermined threshold temperature, the fusible link is activated such that the first substrate decouples from the second substrate due to the solder layer transitioning from a solid state to a liquid state (e.g., melting). The decoupling of the first and second substrates decrease the force applied and generates an activation signal at the actuator, thus activating the fire suppression system.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the coating may be incorporated in the fusible link 102. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fusible link, comprising:

a first substrate extending along an axis from a first end to a second end, the first substrate comprising a first surface, a first aperture between the first end and the second end, and a first protrusion between the first aperture and the second end;

a first plating on the first surface at the second end;

a second substrate extending from a third end to a fourth end, the second substrate comprising a second surface, a second aperture between the third end and the fourth end, and a second protrusion between the second aperture and the third end, the first protrusion sized to be received in the second aperture, the second protrusion sized to be received in the first aperture;

a second plating on the second surface at the fourth end, the first plating and the second plating made of at least one of a nickel alloy, a gold alloy, and a silver alloy, the first plating facing the second surface, the second plating facing the first surface;

a solder layer directly bonded to the first plating of the first substrate and to the second plating of the second substrate, the solder layer to prevent separation of the first substrate and the second substrate until the solder layer reaches a temperature greater than or equal to 500 degrees Fahrenheit and less than or equal to 575 degrees Fahrenheit, the solder layer spaced from the first aperture and from the second aperture;

a coating on the solder layer, the coating comprising a silicone-based paint that withstands the temperature greater than or equal to 500 degrees Fahrenheit and less than or equal to 575 degrees Fahrenheit; and a bracket comprising a first opening outward from the first end relative to the second end and encircling the axis, and comprising a second opening outward from the second end relative to the first end and encircling the axis.

2. The fusible link of claim 1, comprising:

a plurality of hooks to couple the first substrate with a first detection line and the second substrate with a second detection line.

3. The fusible link of claim 1, comprising:

the solder layer comprises a Lead-Indium solder alloy, a Lead-Tin-Silver solder alloy, or a Lead-Tin solder alloy; and the first plating is on at least half of the first surface.

4. The fusible link of claim 1, comprising:

the first end of the first substrate comprises a flange.

5. The fusible link of claim 1, comprising:

the coating is on at least one of the first substrate and the second substrate.

6. A fusible link assembly, comprising:

a first detection line;

a second detection line; and a fusible link, comprising:

a first substrate extending from a first end coupled with the first detection line to a second end, the first substrate comprising a first surface and a first flange at the first end, a first aperture between the first end and the second end, and a first protrusion between the first aperture and the second end;

a first plating on the first surface at the second end;

a second substrate extending from a third end coupled with the second detection line to a fourth end, the second substrate comprising a second surface and a second flange at the second end, the first flange extending from the first surface past a plane of the second surface, the second flange extending from the second surface past a plane of the first surface, a second aperture between the third end and the fourth end, and a second protrusion between the second aperture and the third end, the first protrusion sized to be received in the second aperture, the second protrusion sized to be received in the first aperture;

a second plating on the second surface at the fourth end, the first plating facing the second surface, the second plating facing the first surface;

a solder layer directly bonded to the first plating of the first substrate and to the second plating of the second substrate, the solder layer to prevent the first substrate from decoupling from the second substrate below a temperature threshold, the temperature threshold greater than or equal to 500 degrees Fahrenheit and less than or equal to 575 degrees Fahrenheit, the solder layer spaced from the first aperture and from the second aperture; and a coating on the solder layer, the coating comprising a silicone-based paint that withstands temperature greater than or equal to 500 degrees Fahrenheit and less than or equal to 575 degrees Fahrenheit.

7. The fusible link assembly of claim 6, comprising:

the first plating and the second plating each comprise at least one of a nickel alloy, gold alloy, and silver alloy.

8. The fusible link assembly of claim 6, comprising:

the solder layer comprises a Lead-Indium solder alloy, a Lead-Tin-Silver solder alloy, or a Lead-Tin solder alloy.

9. The fusible link assembly of claim 6, comprising:

a plurality of hooks to couple the first substrate with the first detection line and the second substrate with the second detection line.

10. A fire suppression system, comprising:

a tank having a fire suppressant agent;

a detection line;

a fusible link, comprising:

a first substrate coupled with the detection line, the first substrate comprising a first surface extending between a first end and a second end, a first aperture between the first end and the second end, and a first protrusion between the first aperture and the second end;

a first plating on the first surface;

a second substrate comprising a second surface extending between a third end and a fourth end, a second aperture between the third end and the fourth end, and a second protrusion between the second aperture and the third end, the first protrusion sized to be received in the second aperture, the second protrusion sized to be received in the first aperture;

a second plating on the second surface, the first plating facing the second surface, the second plating facing the first surface;

a solder layer directly bonded to the first plating of the first substrate and to the second plating of the second substrate, the solder layer to prevent the first substrate from decoupling from the second substrate at temperatures below a temperature threshold, the temperature threshold greater than or equal to 500 degrees Fahrenheit and less than or equal to 575 degrees Fahrenheit, the solder layer spaced from the first aperture and from the second aperture;

a coating on the solder layer, the coating comprising a silicone-based paint that withstands temperature greater than or equal to 500 degrees Fahrenheit and less than or equal to 575 degrees Fahrenheit; and a bracket comprising an opening around the detection line; and a release assembly coupled with the detection line, the release assembly to operate the tank responsive to decoupling of the first substrate from the second substrate.

11. The fire suppression system of claim 10, comprising: the first plating and the second plating each comprise at least one of a nickel alloy, gold alloy, and silver alloy.

12. The fire suppression system of claim 10, comprising: the solder layer comprises a Lead-Indium solder alloy, a Lead-Tin-Silver solder alloy, or a Lead-Tin solder alloy.

13. The fire suppression system of claim 10, comprising: the first substrate comprises a flange.

14. The fire suppression system of claim 10, comprising: the coating is on the first substrate and the second substrate.

* * * * *